United States Patent [19]
Weisstuch et al.

[11] 3,878,064
[45] Apr. 15, 1975

[54] METHOD AND APPARATUS FOR MEASURING PITTING CORROSION TENDENCIES

[75] Inventors: Aaron Weisstuch, Yardley; Charles E. Schell, III, Feasterville, both of Pa.

[73] Assignee: Betz Laboratories, Inc., Trevose, Pa.

[22] Filed: July 27, 1973

[21] Appl. No.: 383,212

[52] U.S. Cl. ............ 204/1 T; 204/195 C; 324/71 C; 324/29
[51] Int. Cl. .......................................... G01n 27/46
[58] Field of Search ........... 204/1 T, 195 C; 324/29, 324/71 C

[56] References Cited
UNITED STATES PATENTS

| | | | |
|---|---|---|---|
| 3,549,993 | 12/1970 | Marsh et al. | 204/195 C |
| 3,607,673 | 9/1971 | Seyl | 204/195 C |
| 3,660,249 | 5/1972 | Townsend | 204/195 C |
| 3,716,460 | 2/1973 | Weisstuch et al. | 204/1 T |
| 3,730,869 | 5/1973 | Wilson | 204/195 C |

*Primary Examiner*—T. Tung
*Attorney, Agent, or Firm*—Alexander D. Ricci

[57] ABSTRACT

A Cathode, an Anode wrapped in filter paper or other barrier to oxygen diffusion, a Reference Electrode (and optionally an Auxiliary Electrode) are placed in an aerated electrolytic liquid. The open circuit potential between the Cathode and Reference Electrode is impressed upon a capacitor. By means of a two-position switch an operational amplifier then causes the potential of the anode, in a circuit including the Reference Electrode, Auxiliary Electrode (or the electrode previously used as the Cathode) and an Ammeter, to become equal to the open circuit cathode-reference electrode potential impressed upon the capacitor. The amplifier provides the necessary current of either polarity to achieve the equality. The polarizing current flowing through the Ammeter is read and a qualitative indication of the pitting tendency is obtained.

13 Claims, 5 Drawing Figures

METHOD AND APPARATUS FOR MEASURING PITTING CORROSION TENDENCIES

BACKGROUND OF THE INVENTION

1. Field of the Invention

The invention relates to a method and apparatus for measuring the pitting corrosion tendencies of metals exposed to an aerated electrolytically conductive liquid environment.

In industrial systems a major problem is localized corrosion because corrosion occurring intensely in one particular location, such as at an edge dislocation or screw dislocation, may perforate conduits carrying the electrolytic fluid. Such perforations can obviously cause process leaks or upsets which may shut down an entire system causing lost production time or loss of product.

Pitting corrosion often causes more concern than general corrosion unless the general corrosion is extremely high. This is because general corrosion occurs essentially at a constant rate over an entire surface and will not cause a potentially dangerous leak in as short a period of time as does pitting corrosion.

In aerated systems, pitting corrosion occurs because dissolved oxygen reacts with electrons that are liberated in the anodic corrosion process. When a metal corrodes in the presence of an aerated electrolyte, the metal ions enter the liquid phase and electrons are liberated in the metallic lattice, where they are free to flow about the metallic lattice. The process cannot continue unless these electrons are consumed. If they are not consumed, the metal ions will continue to go into soluation and leave the electrons on the surface of the metal. This will build up an attractive electrostatic potential difference to prevent the further removal of any positive charges from a negatively charged surface. Therefore, these electrons will have to be consumed by some cathodic process. The dissolved oxygen will react with the electrons liberated by the anodic corrosion process, thus producing hydroxyl ions. Due to metallurgical and other phenomena, the bulk of the metal surface is a cathode and the anodic reaction occurs only at a small area at any given period of time. One reason for this is that the regions of high strain density, for example, edge dislocations, screw dislocations, etc., are energetically favorable for dissolution.

Therefore, it will be appreciated that localized corrosion, such as pitting or crevice attack, occurs when the bulk of a metal surface exposed to a corrodant becomes a cathode. In the case of water in cooling tower systems the cathodic reaction is reduction of dissolved oxygen, and the anodic reaction of metal dissolution is limited to small areas. According to electro-chemical theory, the total anodic current must equal the total cathodic current. Consequently, the smaller anode operates at much higher current density than the larger cathode. Because electrode polarization depends upon current densities (current/unit area), it follows that in a pitting situation with a high cathode/anode area ratio the anodes are polarized essentially to the potential of the cathodes.

Specifically, the corroding surface in the case of general corrosion is a dynamic situation, i.e., what is an anode one instant changes and becomes a cathode in the next. Thus, the areas of anode and cathode average out on a statistical basis. But in the case where oxygen is the cathodic reactant, an additional problem occurs in any area where the access of oxygen is restricted. Such an area will become a permanent anode. The area of restricted oxygen thermodynamically is less favorable for oxygen reduction. Therefore, the area becomes an anodic area and will stay an anodic area; thus, the distinction between general corrosion and pitting corrosion.

Another concept which will help in the understanding of the invention is the relationship of the potential between an electrode in an electrolytic solution and a reference electrode relative to the current density which is the current per square unit of area. This is called "polarization." The polarization is actually proportional to the log of the current density and the greater the current density the greater the polarization.

It will be appreciated that the total anodic current must be equal to the total cathodic current; however, as discussed above, the densities do not have to be equal. In other words, it is possible to have a low density over a large cathode area and a small anode area to supply high current density which will equal the entire cathodic current. Thus, the small anodic area supplying the high current density will tend to dissolve or pit that area rather quickly and deeply. Because of the relationship between the polarization and the current density, the cathode is much less polarized than the anode.

Therefore, it is desirable to have a method of predicting the tendency of localized areas to corrode; i.e., to determine whether or not pitting will occur at localized areas of restricted oxygen with a given electrolytic solution.

2. Prior Art

In the past one method of testing for pitting has been by exposing a specimen to what was considered a pitting environment and then counting the pits with the aid of a microscope or a magnifying glass and then giving a qualitative estimate as to the number of pits and the average pit depth.

G. B. Hatch developed the electro-chemical criterion for measuring the pitting tendency which he called the "maximum self-driven anodic current density." He used this term to refer to the maximum current one would obtain from the anode in order to drive it up to the cathode's open circuit potential. His specific method will be discussed below. Essentially, however, what he and others have found is that if one restricts an area to oxygen diffusion, it becomes the anode. The remaining large bulk of metallic surface where oxygen is diffusing and where there is free oxygen access becomes the cathode. Thus the "maximum self-driven anodic current density" will be proportional to the pitting tendency.

Various prior art attempts to measure crevice corrosion, such as Marsh et al., U.S. Pat. No. 3,042,863 and Fitzpatrick et al., U.S. Pat. No. 3,599,090, have utilized a resistance bridge arrangement. Such systems require a great amount of time to make the necessary determinations.

The prior patent to Weisstuch, Schell and Dryden U.S. Pat. No. 3,716,460, issued Feb. 13, 1973, to the assignee of the instant invention, illustrates a method and apparatus for determining corrosion rate and utilizes much of the same circuitry as discussed below. Actually, the device of the earlier patent has been modified to accomplish the results obtained herein.

SUMMARY OF THE INVENTION

An object of the instant invention is to quickly and accurately measure the pitting corrosion tendencies of metals exposed to an aerated, electrolytic liquid.

This object, as well as others, is achieved by the provision of a Cathode, an Anode wrapped in filter paper or other substance to restrict oxygen access and a Reference Electrode in a liquid. In certain instances an Auxiliary Electrode may also be used in addition to the Cathode. The open circuit potential between the Cathode and Reference Electrode is first impressed upon a capacitor. By means of a two-position switch an operational amplifier then causes the potential of the anode, in a circuit including the Reference Electrode, Auxiliary Electrode (or the electrode previously used as the Cathode) and an ammeter, to become equal to the open-circuit cathode-reference electrode potential impressed upon the capacitor. The amplifier provides the necessary current of either polarity to achieve the equality. The current flowing through the ammeter, which is equivalent to Hatch's "maximum self-driven anodic current" is read and a qualitative indication of the pitting tendency is obtained.

BRIEF DESCRIPTION OF THE DRAWINGS

The above and other objects will be appreciated by reference to the following description and claims, taken in conjunction with the accompanying drawings wherein:

DETAILED DESCRIPTION OF THE INVENTION

Figure 1:
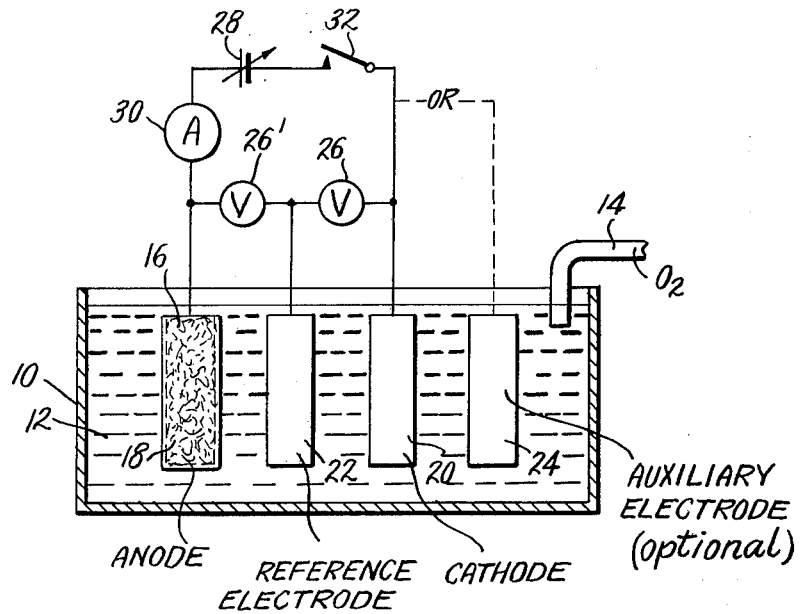
FIG. 1 is a basic circuit diagram illustrating the measurements performed by the instant invention and noted as Prior Art.

Reference is first made to FIG. 1 which illustrates the measurements performed by the instant invention with reference to the prior art work of Hatch.

A container 10 is illustrated with an electrolytic solution 12 therein. Oxygen is bubbled into the solution at 14 to obtain an aerated environment. An Anode of steel is wrapped with a filter paper 18 such as Whatman No. 120 to restrict access of the dissolved oxygen. A steel Cathode 20 has oxygen freely accessible thereto. A Reference Electrode 22 and an optional Auxiliary Electrode 24 are also positioned in the electrolyte. With switch 32 in its open-circuit position a potential is measured between Cathode 20 and the Reference Electrode 22 by means of a high input impedance voltmeter 26. The potential is then measured on voltmeter 26' between the Anode 16 and Reference Electrode 22. With switch 32 in its closed-circuit position, an adjustable power supply 28 is used to supply current to the Anode and either the Cathode or the Auxiliary Electrode. Once the Cathode potential is recorded it is no longer needed; therefore, the Auxiliary Electrode is not necessary. Thus, it will be noted that this system, as well as the systems illustrated below, have either three or four electrodes. The power supply 28 is manually adjusted, and current is applied to the Anode 16 until the value on voltmeter 26' equals that which was previously read on oltmeter 26. This provides a potential on the Anode equal to the open circuit value for the cathode. The current required appears on an ammeter 30.

Hatch has termed this the "maximum self-driven anodic current density" (even though it is actually driven externally).

The reading obtained on the ammeter is essentially an indication to the effect that if there were an anode located on a piece of metal which was otherwise entirely a cathode and it was corroding by itself, it would be providing its own current. In other words, the anode would be providing its maximum self-driven current to achieve the same potential as the cathode.

Figure 2:
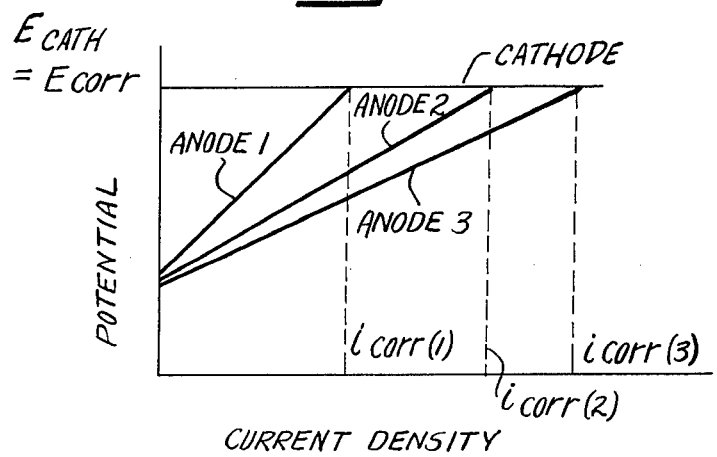
FIG. 2 is a graphical analysis of potential versus current density relative to the circuit measurements.

FIG. 2 illustrates the above phenomena in that while the Cathode corrosion potential ($E_{corr.}^{cath.}$) is more positive than the anode corrosion potential ($E_{corr.}^{anode}$), it remains essentially constant at the value indicated. However, the anode must be polarized up to the cathode corrosion potential. Thus, the current required to effect the polarization is Hatch's "maximum self-driven anodic current density". The three cases illustrate that while the difference in anode and cathode potential is the same, the maximum currents are different--the higher the current, the larger the tendency for pitting. The particular significance of the situation is that the cathode's potential is little affected by the fact that there is some amount of current flowing because the amount is small in relation to unit area. On the other hand, the anode (which is very small in area compared to the cathode) has a large current concentrated in a small area, and this relationship is what determines the slope or polarization--hence the pitting tendency. Stated another way, if the cathode corrosion potential is ascertained as being the line marked "Cathode," then the corrosion current necessary to cause pitting would be that amount needed to raise the anode potential to the level of the cathodic corrosion potential. If, on the other hand, it is necessary to put out current comparable to a longer line to reach the cathode's potential, it would be a more dangerous situation.

The various circuit diagrams set out below illustrate extremely simple and reliable apparatus for achieving the results obtained with great effort and expense with the prior art. Also, it will be appreciated that the systems illustrated below can be easily used by a workman in the field.

FOUR ELECTRODE SYSTEM (FIG. 3)

A container 110 is illustrated having an electrolyte 112 therein. Positioned in the electrolyte is an Auxiliary Electrode 114, a Reference Electrode 116, a Cathode 118 and an Anode 120. The Anode is wrapped with filter paper or other material to restrict oxygen access while the Cathode is freely accessible to oxygen. A two position switch has ganged movable contacts 122a, 122b, and 122c. These movable contacts alternately contact a normal position 1 and a second position 2. An operational amplifier 124 employing field effect transistors to achieve a high input impedance is connected across the switch contacts of movable contact 122c. An ammeter 126 is connected between movable contact 122a and the output of the amplifier 124. A storage device in the form of a low leakage capacitor 128 is connected between position 1 associated with movable contact 122c and circuit ground.

Since the switch contacts are normally in the 1 position, the low leakage capacitor is charged to the potential difference between the Cathode 118 and the Reference Electrode 116. Thus, current sufficient to charge the capacitor 128 to the open circuit Cathode-reference potential will flow from Cathode 118 through the electrolyte to the Reference Electrode 116. A line 130 carries the current through movable contact 122c, capacitor 128, movable contact 122b and a line 132 back to the Cathode.

When the instrument is turned to position 2, the Cathode is left free; however, the potential between the Cathode and the Reference Electrode has been impressed on the capacitor 128. The amplifier 124 will now attempt to make the potential between its inverting (−) input and ground equivalent to that between its non-inverting (+) input and ground. Therefore, current of either polarity flows through the ammeter, movable contact 122a, a line 134 to the Auxiliary Electrode 114, then through the electrolyte to the Anode, through line 136, movable contact 122b, and thence to ground. This current is of a polarity and magnitude so as to cause the potential difference across the amplifier input terminals to be zero. Essentially, no current flows through the reference electrode and conductor 130 into the (−) input of the amplifier.

It will be appreciated that the operational amplifier 124 will cause the potential of the anode, in a circuit including the Reference Electrode, Auxiliary Electrode and ammeter, to be equal to the open circuit test-reference potential impressed on the capacitor. This is accomplished by impressing the constant positive potential stored on capacitor 128 on the positive input of the amplifier.

The amplifier then provides current of either polarity through the ammeter, through contact 122a, to the Auxiliary Electrode and through the electrolyte to the Anode so that the potential between the anode and the reference becomes the same as that originally stored on the capacitor.

FOUR ELECTRODE SYSTEM WITH IR COMPENSATION (FIG. 4)

In some instances the above discussed circuit has disadvantages for which compensation must be made. In certain industrial environments the electrodes which are positioned in a fluid conduit are located a considerable distance from the instrument. In such instances an extension cable must be run from the instrument to the probe containing the electrodes. It will be appreciated that since the measurements are in the order of millivolts, an IR drop will occur due to the current flow through the cables. The cable IR drop will add to the system voltages and the combination will be applied to the amplifier input, resulting in erroneous readings. In other words, since the instrument measures the potential difference to ground and if there is an additional IR drop included to ground, the instrument will not be able to distinguish between the two IR drops, and it will produce an inaccurate reading.

To compensate for the effect of the cable IR drop, a further embodiment of the instant invention incorporates a unique grounding circuit arrangement.

Figure 3:
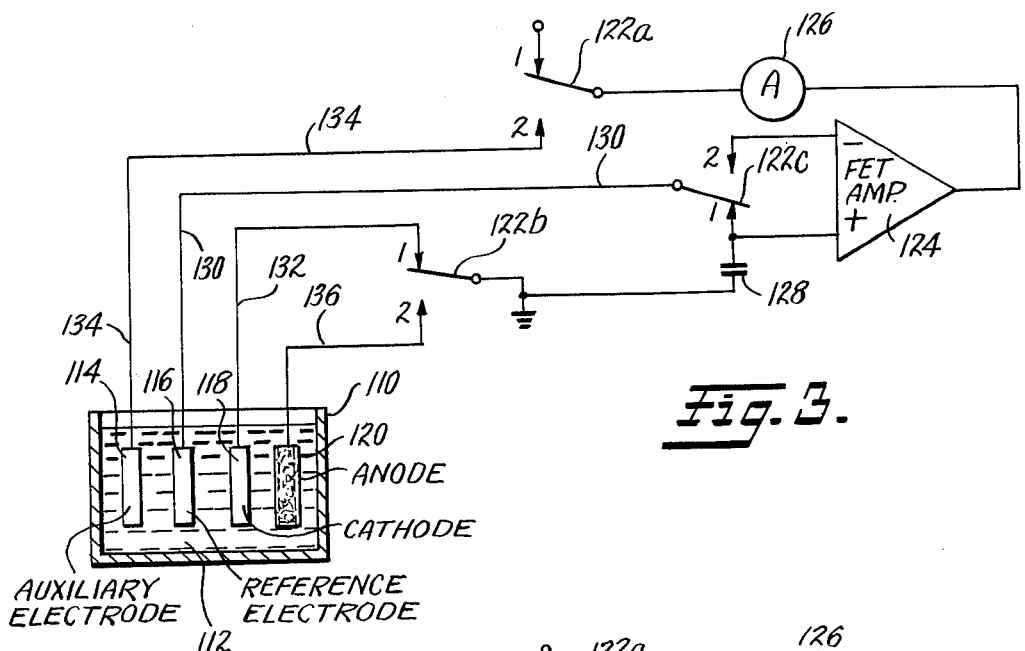
FIG. 3 is a circuit diagram of one form of the invention having four electrodes.
Figure 4:
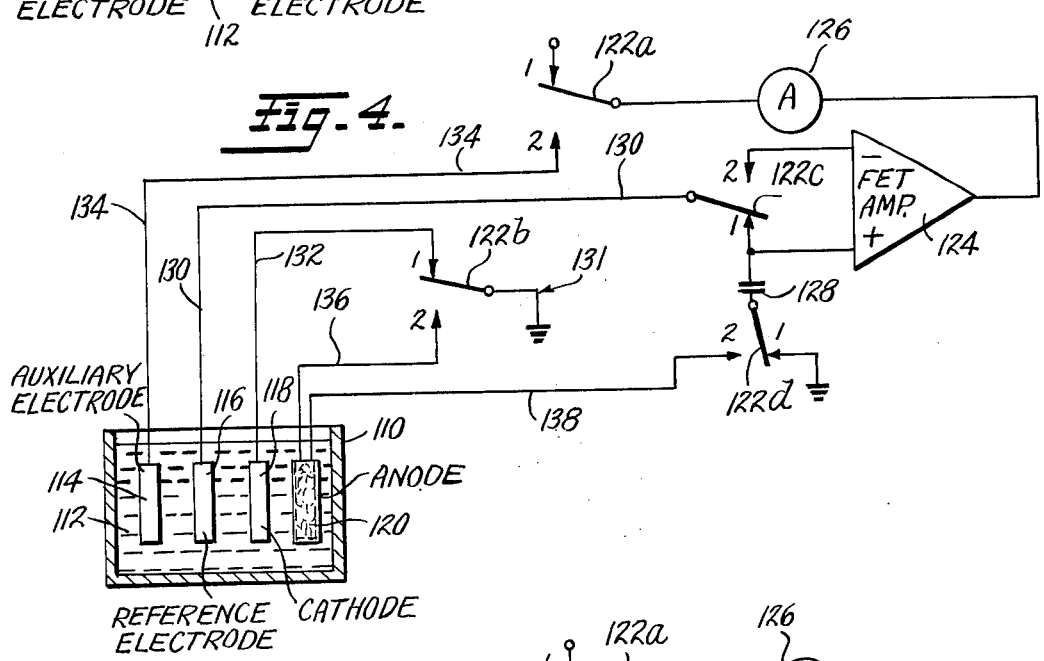
FIG. 4 is a circuit diagram of the embodiment of FIG. 3 and including means for cable IR compensation.

Reference is now made to FIG. 4 which includes the same basic circuitry as FIG. 3, except for the fact that an additional movable contact 122d is added. Position 1 of this switch is connected to ground and position 2 is connected to the Anode via line 138.

Therefore, in operation, when the switches are in position 1, which is essentially the OFF position of the instrument, the low leakage capacitor 128 will be charged to the potential between Cathode 118 and Reference Electrode 116 by current flow between the Cathode and Reference Electrode, through line 130, movable contact 122c, capacitor 128, movable contact 122d and ground. The Cathode ground circuit is completed via line 131 and movable switch contact 122b.

When the switches are moved to position 2 the Cathode is disconnected and the Anode is connected into the circuit. The original potential which was placed on capacitor 128 and which represents the Cathode-Reference Electrode potential acts as the reference potential for the potentiostatic circuit.

The current flow between the Auxiliary Electrode and the Reference Electrode is the same as discussed above in relation to FIG. 4.

It will be appreciated that by directly grounding the Anode through contact 122b and connecting line 138 to the capacitor, the Anode is effectively grounded and the cable IR drop is eliminated from the meter reading.

THREE ELECTRODE SYSTEM (FIG. 5)

Figure 5:
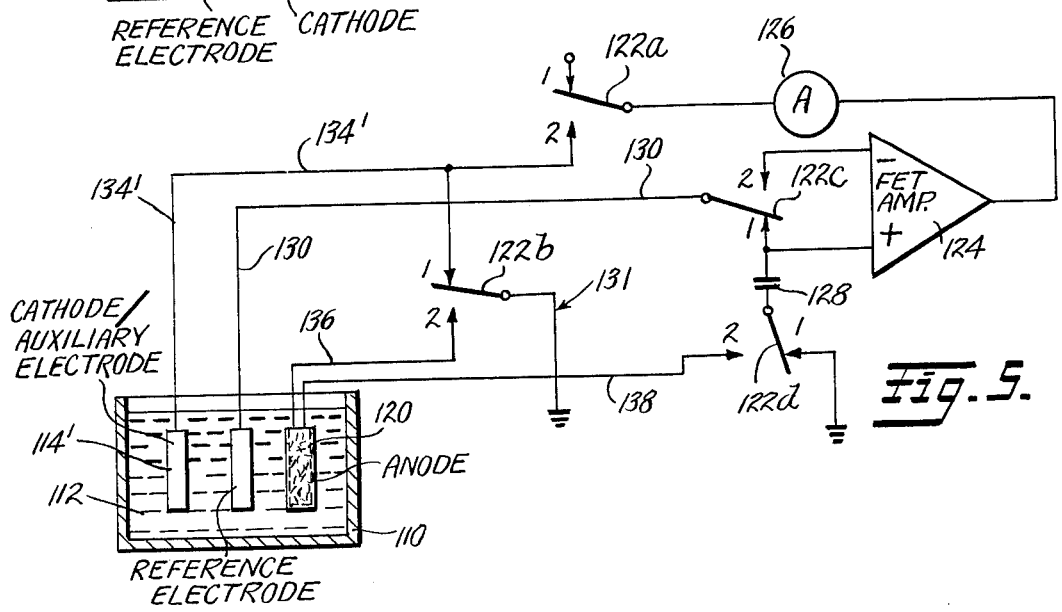
FIG. 5 is another embodiment of the invention using three electrodes.

The circuit illustrated in FIG. 5 which utilizes three electrodes, eliminating the need for a separate Auxiliary Electrode, is essentially the same as that illustrated in FIG. 4. It will be appreciated that since the Cathode is not needed once the Cathode-Reference Electrode potential is impressed upon the capacitor 128, it may be re-utilized as the Auxiliary Electrode. This is what has been done in FIG. 5.

The current will flow in the position 1 situation from the Reference Electrode through the electrolyte to the Cathode/Auxiliary Electrode 114', through line 134' and switch contact 122b to ground. The capacitor 128 is grounded through movable contact 122d and connected to the Reference Electrode 116 by means of movable contact 122c and line 130.

When the switch is moved to position 2, the Cathode becomes the Auxiliary Electrode and the potential on capacitor 128 will be applied to the positive input of the amplifier 124 causing current to flow through ammeter 126, movable contact 122a, line 134' to Electrode 114'. From Electrode 114' the current will flow through the electrolyte to the Anode 120, line 136, movable contact 122b to ground, via line 131. Thus, the anode-reference electrode potential will become equal to the cathode-reference electrode open-circuit potential.

As indicated in the discussion relative to FIG. 1, the Anode and Cathode are of the same material, whose pitting corrosion tendency is to be determined, such as steel, The Reference Electrode may be made of steel or a dissimilar material, as may the Auxiliary Electrode.

The Ammeter 126 may be calibrated in any convenient terms.

While one embodiment of the invention has been described, it will be understood that it is capable of many further modifications and this application is intended to cover any variations, uses, or adaptions of the invention following in general, the principles of the invention and including such departures from the present disclosure as come within knowledge or customary practice in the art to which the invention pertains, and as may be ap-

We claim:

1. A method of measuring the pitting corrosion tendency of metal exposed to an electrolytic liquid, comprising:
   a. placing a first and a second electrode in the electrolytic liquid wherein access to oxygen is unrestricted, said electrodes having an open circuit potential therebetween,
   b. storing the open circuit potential on a storage means,
   c. disconnecting the first electrode from the storage means and connecting a third electrode to which oxygen access is restricted thereto, said third electrode being in the liquid and the only electrode to which oxygen access is restricted,
   d. placing a fourth electrode in the liquid,
   e. connecting the fourth electrode in a circuit including the second electrode upon disconnecting of the first electrode and connecting of the third electrode to the storage means,
   f. causing the potential of a circuit including the third electrode, the fourth electrode and the storage means to equal the potential initially stored on the storage means, and
   g. measuring the current required to cause the potential of the circuit including the third electrode to equal the potential of the circuit including the first electrode whereby the pitting corrosion tendency is ascertained.

2. A method as defined in claim 1 wherein the storage means is a capacitor.

3. A method as defined in claim 1 including switching the first electrode between said circuits.

4. A method as defined in claim 1 including placing a high input impedance operational amplifier in said second circuit for causing said potentials to be equal.

5. A method as defined in claim 1 including directly grounding the third electrode to eliminate cable IR drop from the circuits including the third electrode.

6. A method as defined in claim 1 wherein said first electrode is a cathode, said second electrode is a reference, said third electrode is an anode, and said storage means is a capacitor.

7. A pitting corrosion tendency measuring apparatus comprising:
   a. an anode to which oxygen access is restricted,
   b. a cathode to which oxygen access is unrestricted,
   c. a reference electrode to which oxygen access is unrestricted,
   d. an auxiliary electrode to which oxygen access is unrestricted,
   e. a storage means,
   f. means for connecting said storage means, cathode and reference electrode in a circuit to store the open circuit potential on said storage means,
   g. means for switching said storage means into a circuit including said anode and said auxiliary electrode,
   h. means for causing the potential of the circuit including the anode and auxiliary electrode to equal the potential initially stored on the storage means, and
   i. an ammeter means for measuring the current required to reach said equal potential, said auxiliary electrode being in series with said ammeter.

8. An apparatus as defined in claim 7 wherein said storage means is a capacitor.

9. An apparatus as defined in claim 7 wherein said anode and cathode are steel.

10. An apparatus as defined in claim 7 wherein said causing means includes an operational amplifier having one input connected to said storage means and a second input connected to said reference electrode.

11. An apparatus as defined in claim 7 including means for eliminating cable IR drop between said anode and said measuring means.

12. An apparatus as defined in claim 11 wherein said eliminating means includes means for grounding said anode.

13. A pitting corrosion tendency measuring apparatus comprising:
   a. an anode to which oxygen access is restricted,
   b. a cathode to which oxygen access is unrestricted,
   c. a reference electrode to which oxygen access is unrestricted,
   d. a capacitor,
   e. means for connecting said capacitor, cathode and reference electrode in a circuit through a pair of double pole switches to store the open circuit potential on said capacitor,
   f. said switches switching said capacitor into a circuit including said anode,
   g. means for causing the potential of the circuit including the anode to equal the potential initially stored on the capacitor, said causing means including an operational amplifier having a pair of input terminals and an output terminal, each input terminal connected to a pole of one of said switches, one of said input terminals also being connected to said capacitor,
   h. an ammeter connected to said output terminal for measuring the current required to reach said equal potential.

* * * * *